(12) United States Patent
Carpenter et al.

(10) Patent No.: US 11,392,372 B1
(45) Date of Patent: Jul. 19, 2022

(54) IDENTIFICATION OF DEPENDENCIES AMONG SOFTWARE ENTITIES

(71) Applicant: Dell Products L. P., Round Rock, TX (US)

(72) Inventors: Dónal Carpenter, Wicklow (IE); Adam Jasinski, Dublin (IE); Zygimantas Mockus, Dublin (IE); Carlos Manuel dos Santos Martins Rodrigues, Sallynoggin (IE)

(73) Assignee: Dell Products L.P., Round Rock, TX (US)

( * ) Notice: Subject to any disclaimer, the term of this patent is extended or adjusted under 35 U.S.C. 154(b) by 458 days.

(21) Appl. No.: 15/897,641

(22) Filed: Feb. 15, 2018

(51) Int. Cl.
 *G06F 8/75* (2018.01)
 *G06F 8/73* (2018.01)
 *G06F 9/455* (2018.01)

(52) U.S. Cl.
 CPC ................ *G06F 8/75* (2013.01); *G06F 8/73* (2013.01); *G06F 9/45558* (2013.01)

(58) Field of Classification Search
 CPC ........... G06F 8/75; G06F 8/73; G06F 9/45558
 See application file for complete search history.

(56) References Cited

U.S. PATENT DOCUMENTS

| | | | | |
|---|---|---|---|---|
| 2008/0201705 | A1* | 8/2008 | Wookey | G06F 8/658 717/175 |
| 2010/0023926 | A1* | 1/2010 | Sugawara | G06F 8/458 717/120 |
| 2010/0037211 | A1* | 2/2010 | Zakonov | G06F 11/3604 717/130 |

* cited by examiner

*Primary Examiner* — Wei Y Zhen
*Assistant Examiner* — Amir Soltanzadeh
(74) *Attorney, Agent, or Firm* — Ryan, Mason & Lewis, LLP (57) ABSTRACT

Techniques are provided for identifying dependencies among multiple software entities. One exemplary method comprises scanning source code and/or configuration information of a given software entity to extract connection information for connections made by the given software entity with other software entities, wherein at least one connection made by the given software entity is an asynchronous connection that employs asynchronous messaging using an intermediate message broker; resolving at least one uniform resource identifier in the extracted connection information to obtain a corresponding network address; analyzing the source code associated with the asynchronous connection to determine whether the given software entity is a producer or a consumer associated with the asynchronous connection; and generating a dependency graph identifying a plurality of the other software entities that depend on the given software entity. The dependency graph is optionally generated by aggregating the connections of the given software entity with connections by other software entities.

20 Claims, 5 Drawing Sheets

FIG. 1

APPLICATION ONBOARDING
USER INTERFACE

APPLICATION NAME: 210

APPLICATION VERSION: 220

APPLICATION NETWORK ADDRESS: 230

SOURCE CODE LOCATION: 240

CONFIGURATION INFORMATION LOCATION: 250

IDENTIFICATION OF DEPENDENCIES AMONG SOFTWARE ENTITIES

FIELD

The field relates generally to techniques for understanding dependencies among multiple software applications and other software entities.

BACKGROUND

In a modern enterprise environment, multiple software applications often impact one another and exhibit complex inter-dependencies. Understanding these dependencies, however, is not trivial. When a given software application is updated, for example, it is important to identify the other software applications that may be impacted by the update, especially when middleware asynchronously connects the various software applications.

A need therefore exists for techniques for mapping multiple software entities, such as software applications, based on their inter-dependencies.

SUMMARY

Illustrative embodiments of the present disclosure provide techniques for identifying dependencies among multiple software entities. An exemplary method comprises: scanning source code and/or configuration information of a given software entity to extract connection information for connections made by the given software entity with other software entities, wherein at least one of the connections made by the given software entity with the other software entities is an asynchronous connection that employs asynchronous messaging using an intermediate message broker; resolving at least one uniform resource identifier in the extracted connection information to obtain a corresponding network address; analyzing the source code associated with the asynchronous connection to determine whether the given software entity is a producer or a consumer associated with the asynchronous connection; and generating a dependency graph for the given software entity identifying a plurality of the other software entities that depend on the given software entity using one or more of the corresponding network address, the producer and the consumer.

In some embodiments, the dependency graph is generated by aggregating the connections of the given software entity with connections by other software entities.

Other illustrative embodiments include, without limitation, apparatus, systems, methods and computer program products comprising processor-readable storage media.

DETAILED DESCRIPTION

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide methods, apparatus and/or computer program products for identifying dependencies among multiple software entities.

In one or more embodiments, source code and/or configuration information of a given software entity is scanned, for example, using static code analysis, to extract external dependencies, such as connection information for connections made by the given software entity with other software entities. As used herein, a software entity comprises a software application or other software, as would be apparent to a person of ordinary skill in the art.

According to one aspect of the disclosure, the connections made by the given software entity with the other software entities include synchronous connections and asynchronous messaging using an intermediate message broker. The source code associated with the asynchronous connection is analyzed using static code analysis to determine whether the given software entity is a producer or a consumer associated with the asynchronous connection.

In some embodiments, a dependency graph is generated for the given software entity identifying the other software entities that depend on the given software entity. For example, the scan data for multiple applications can be combined, or aggregated, to identify the dependencies between multiple applications within an enterprise.

Generally, in some embodiments, for a synchronous dependency, a first application connects to a second application and initiates a request (pull), where the dependency is from the first application to the second application. In an asynchronous dependency, one application consumes a message via a message broker that is published by another application. In this case, the dependency is from the consumer application to the producer application.

Figure 1:
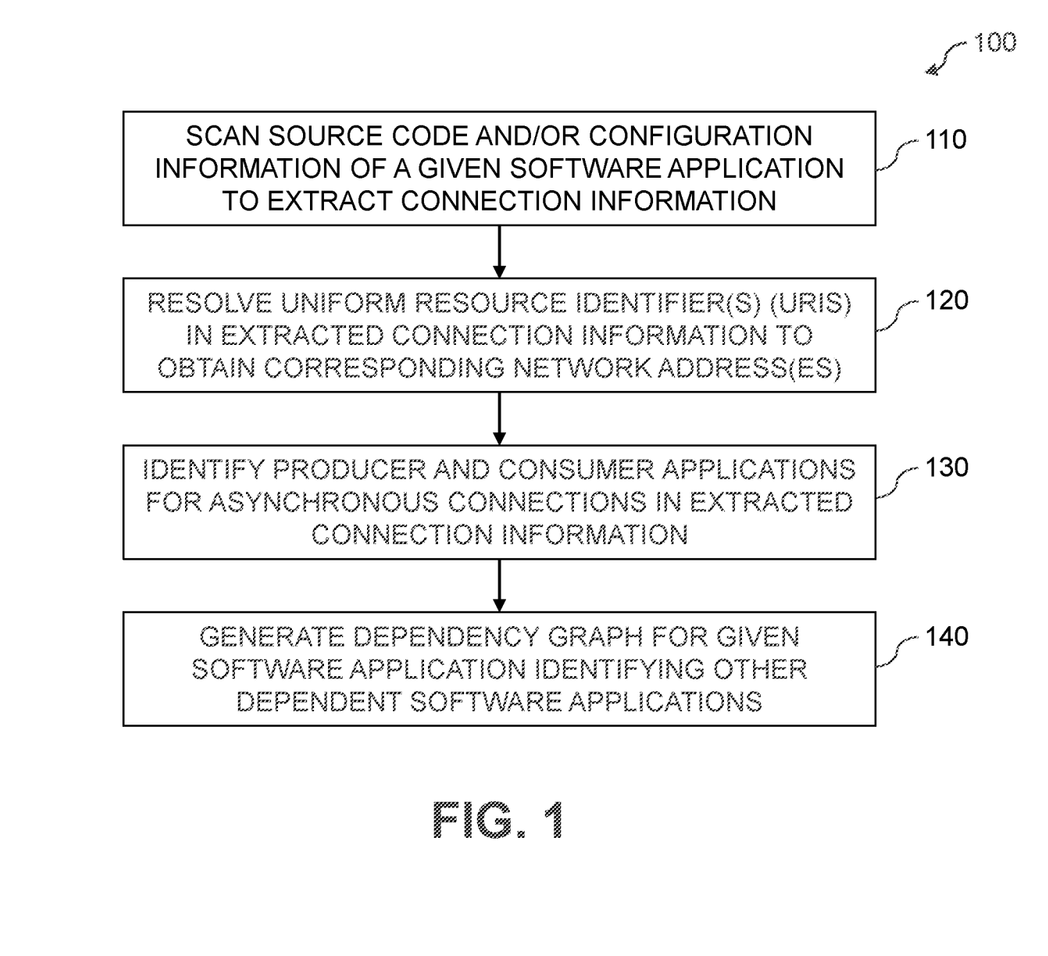
FIG. 1 is a flow chart illustrating an exemplary implementation of a dependency identification process, according to one embodiment of the disclosure.

FIG. 1 is a flow chart illustrating an exemplary implementation of a dependency identification process 100, according to one embodiment of the disclosure. As shown in FIG. 1, the exemplary dependency identification process 100 initially scans the source code and/or configuration information of a given software application during step 110 to extract the connection information using static code analysis. The extracted connection information may include, for example, canonical name records (e.g., CNAME records) in the Domain Name System (DNS) used to specify that a uniform resource identifier (e.g., a domain name) is an alias for another domain (the "canonical" domain), as well as virtual IP addresses (VIPs) and wide IP addresses (WIP).

During step 120, the exemplary dependency identification process 100 resolves the uniform resource identifier(s) in the extracted connection information to obtain the corresponding network address(es). The producer and consumer applications for the asynchronous connections in the extracted connection information are identified during step 130 using further static code analysis.

Finally, a dependency graph is generated during step 140 for the given software application. Generally, the dependency graph identifies other dependent software applications, as discussed further below in conjunction with FIG. 3.

Figure 2:
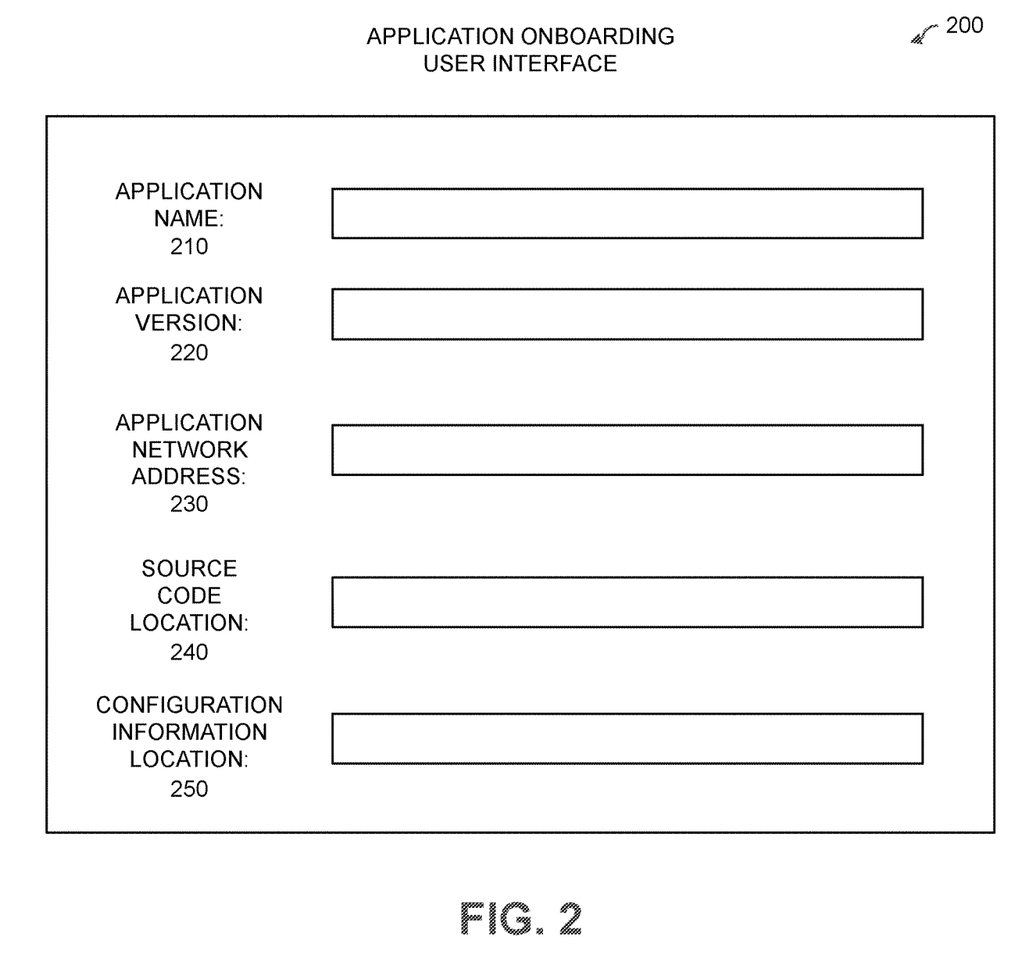
FIG. 2 illustrates an exemplary user interface for onboarding software applications, according to an embodiment of the disclosure.

FIG. 2 illustrates an exemplary application onboarding user interface 200, according to an embodiment of the disclosure. In this manner, an application can be onboarded for dependency identification using the exemplary user interface 200 of FIG. 2.

As shown in FIG. 2, the exemplary user interface 200 comprises a field 210 for entering the application name, optionally along with the CNAME/VIP/WIP for the application. In addition, the application version is optionally specified in field 220, as the same software application can have different versions (e.g., production and test versions).

The application network address (e.g., a URL) that is used by other applications to communicate with the given application is specified in field 230.

Finally, the locations of the source code and configuration information can be specified in fields 240 and 250, respectively.

Figure 3:
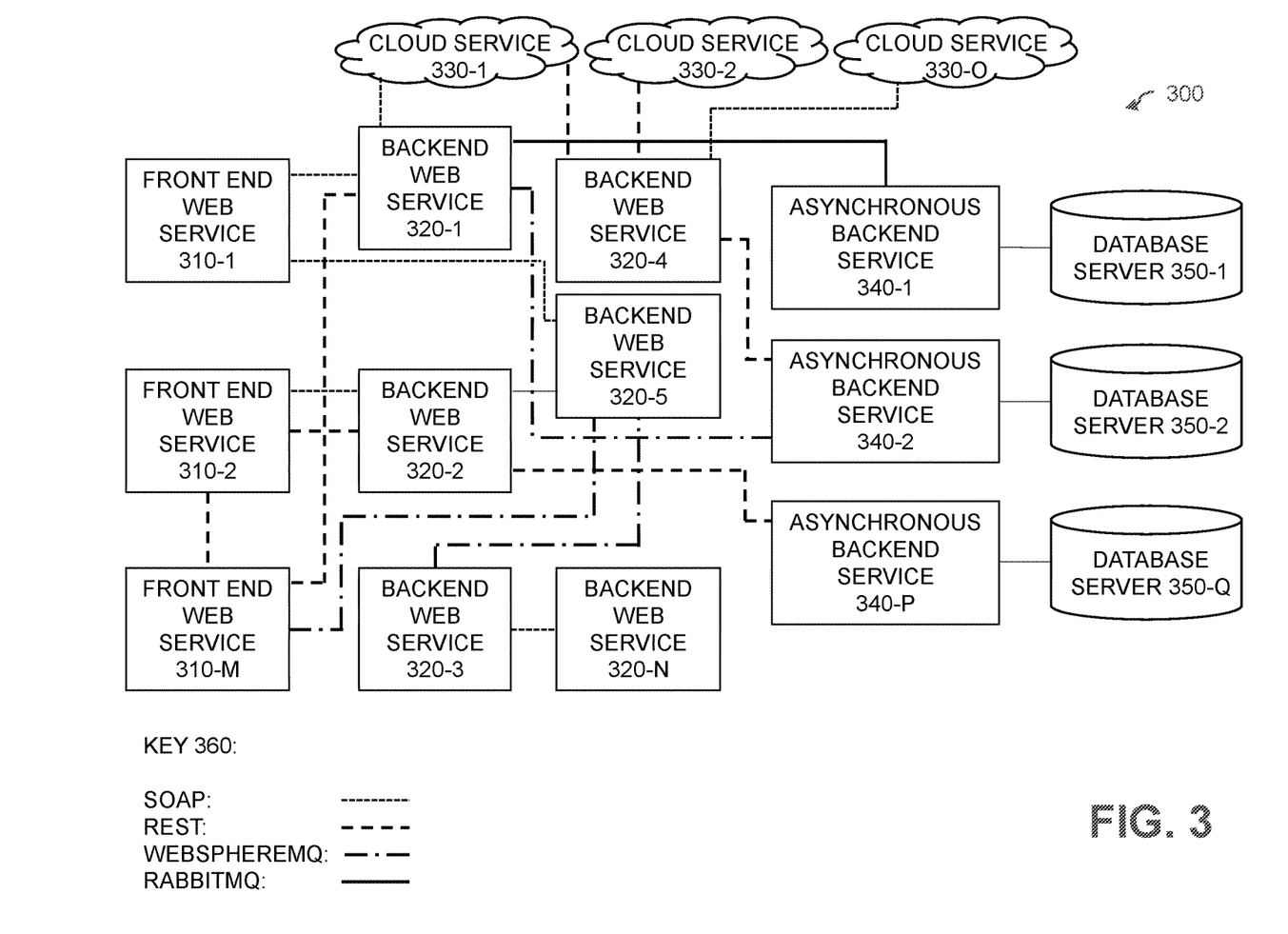
FIG. 3 illustrates an exemplary enterprise dependency graph, according to some embodiments.

FIG. 3 illustrates an exemplary enterprise dependency graph 300, according to some embodiments. As noted above, in some embodiments, the dependency graph 300 is generated for the given software entity identifying the other software entities that depend on the given software entity. For example, the scan data for multiple applications can be combined, or aggregated, to identify the dependencies between multiple applications within an enterprise.

The exemplary enterprise dependency graph 300 of FIG. 3 comprises multiple front end web services 310-1 through 310-M, backend web services 320-1 through 320-N; cloud services 330-1 through 330-O, asynchronous backend services 340-1 through 340-P, and database servers 350-1 through 350-Q, for a representative enterprise.

The scanning of the various software applications of the enterprise (e.g., front end web services 310, backend web services 320, cloud services 330, asynchronous backend services 340 and database servers 350) by the dependency identification process 100 extracted the connection information for connections made by the various software applications and services of the enterprise.

As shown by the key 360 in FIG. 3, the exemplary connections between the various software applications and services of the enterprise comprise Simple Object Access Protocol (SOAP) and Representational State Transfer (REST) synchronous connections to access web services. In addition, the exemplary connections between the various software applications and services of the enterprise comprise WebSphereMQ asynchronous connections (using IBM Web Sphere MQ) and RabbitMQ asynchronous connections (using RabbitMQ open source message broker software for sending and receiving messages). While one or more exemplary embodiments employ Web SphereMQ and/or RabbitMQ message brokers, other message brokers may be employed in alternate embodiments, as would be apparent to a person of ordinary skill in the art.

The disclosed techniques for identifying dependencies among multiple software entities provide improved documentation of complex software systems comprising multiple dependent software entities. Among other benefits, the disclosed dependency identification techniques provide an improved tool that may be used for training and/or resource forecasting within an enterprise.

One or more embodiments of the disclosure provide improved techniques for identifying dependencies among multiple software entities. In some embodiments, predefined remedial action may be initiated when one or more dependent software entities are updated and/or suspend communications. The foregoing applications and associated embodiments should be considered as illustrative only, and numerous other embodiments can be configured using the techniques disclosed herein, in a wide variety of different applications.

It should also be understood that the disclosed dependency identification techniques, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for identifying dependencies among multiple software entities may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services can be offered to cloud infrastructure tenants or other system users as a Platform-as-a-Service (PaaS) offering, although numerous alternative arrangements are possible.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a dependency identification engine, or portions thereof, are illustratively implemented for use by tenants of such a multi-tenant environment.

Cloud infrastructure as disclosed herein can include cloud-based systems such as Amazon Web Services (AWS), Google Cloud Platform (GCP) and Microsoft Azure. Virtual machines provided in such systems can be used to implement at least portions of a dependency identification platform in illustrative embodiments. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 4 and 5. These platforms may also be used to implement at least portions of other information processing systems in other embodiments.

Figure 4:
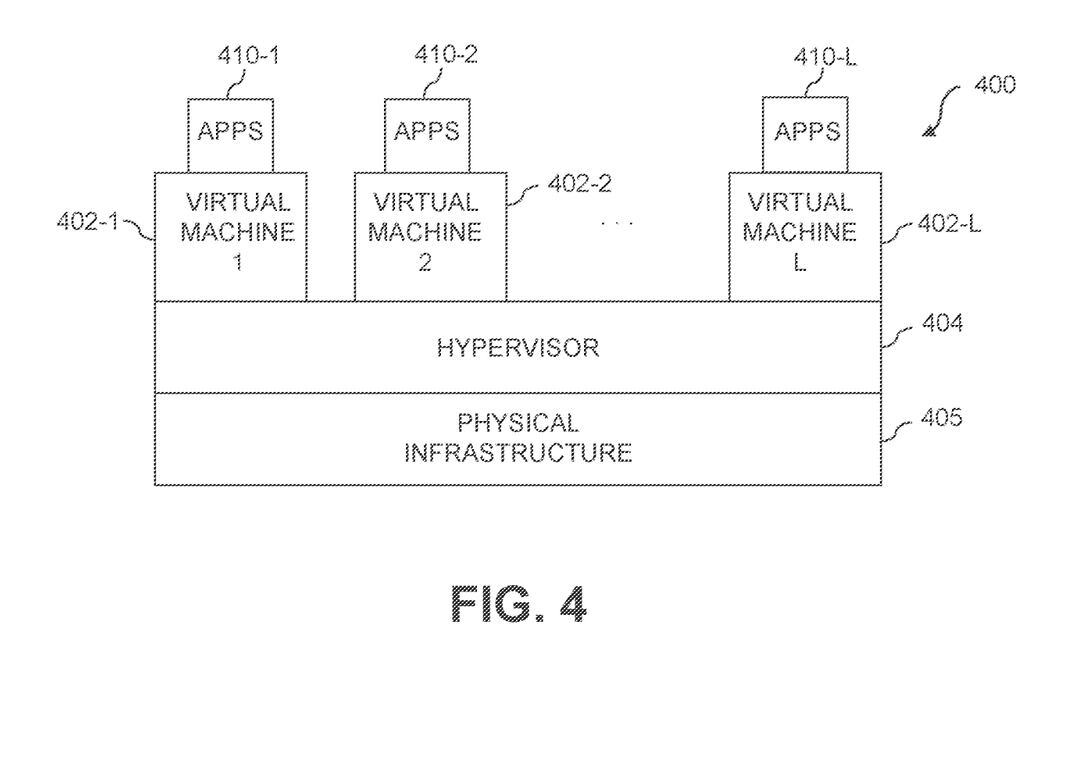
FIG. 4 illustrates an exemplary processing platform that may be used to implement at least a portion of one or more embodiments of the disclosure comprising a cloud infrastructure.

Referring now to FIG. 4, one possible processing platform that may be used to implement at least a portion of one or more embodiments of the disclosure comprises cloud infrastructure 400. The cloud infrastructure 400 in this exemplary processing platform comprises virtual machines (VMs) 402-1, 402-2, . . . 402-L implemented using a hypervisor 404. The hypervisor 404 runs on physical infrastructure 405. The cloud infrastructure 400 further comprises sets of applications 410-1, 410-2, . . . 410-L running on respective ones of the virtual machines 402-1, 402-2, . . . 402-L under the control of the hypervisor 404.

The cloud infrastructure 400 may encompass the entire given system or only portions of that given system, such as one or more of client, servers, controllers, or computing devices in the system.

Although only a single hypervisor 404 is shown in the embodiment of FIG. 4, the system may of course include multiple hypervisors each providing a set of virtual machines using at least one underlying physical machine. Different sets of virtual machines provided by one or more hypervisors may be utilized in configuring multiple instances of various components of the system.

An example of a commercially available hypervisor platform that may be used to implement hypervisor 404 and possibly other portions of the system in one or more embodiments of the disclosure is the VMware® vSphere™ which may have an associated virtual infrastructure management system, such as the VMware® vCenter™. As another example, portions of a given processing platform in some embodiments can comprise converged infrastructure such as VxRail™, VxRack™, VxBlock™, or Vblock® converged infrastructure commercially available from VCE, the Virtual Computing Environment Company, now the Converged Platform and Solutions Division of Dell EMC of Hopkinton, Mass. The underlying physical machines may comprise one or more distributed processing platforms that include storage products.

Particular types of storage products that can be used in implementing a given storage system of the dependency identification system in an illustrative embodiment include VNX® and Symmetrix VMAX® storage arrays, software-defined storage products such as ScaleIO™ and ViPR®, all-flash and hybrid flash storage arrays such as Unity™, cloud storage products such as Elastic Cloud Storage (ECS), object-based storage products such as Atmos®, scale-out all-flash storage arrays such as XtremIO™, and scale-out NAS clusters comprising Isilon® platform nodes and associated accelerators, all from Dell EMC. Combinations of multiple ones of these and other storage products can also be used in implementing a given storage system in an illustrative embodiment.

In some embodiments, the cloud infrastructure additionally or alternatively comprises a plurality of containers implemented using container host devices. For example, a given container of cloud infrastructure illustratively comprises a Docker container or other type of LXC. The containers may be associated with respective tenants of a multi-tenant environment of the system, although in other embodiments a given tenant can have multiple containers. The containers may be utilized to implement a variety of different types of functionality within the system. For example, containers can be used to implement respective compute nodes or cloud storage nodes of a cloud computing and storage system. The compute nodes or storage nodes may be associated with respective cloud tenants of a multi-tenant environment of system. Containers may be used in combination with other virtualization infrastructure such as virtual machines implemented using a hypervisor.

As is apparent from the above, one or more of the processing modules or other components of the disclosed dependency identification apparatus may each run on a computer, server, storage device or other processing platform element. A given such element may be viewed as an example of what is more generally referred to herein as a "processing device." The cloud infrastructure 400 shown in FIG. 4 may represent at least a portion of one processing platform.

Figure 5:
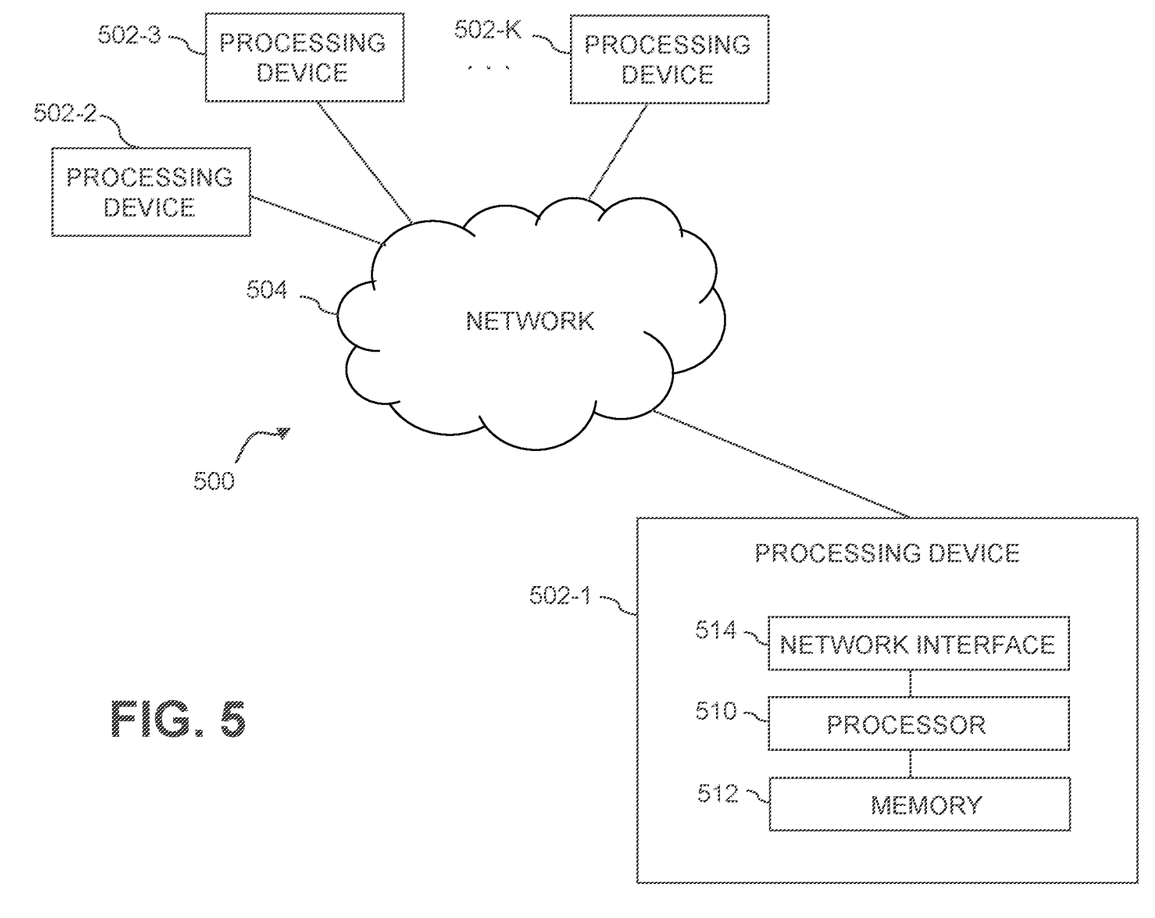
FIG. 5 illustrates another exemplary processing platform that may be used to implement at least a portion of one or more embodiments of the disclosure.

Another example of a processing platform is processing platform 500 shown in FIG. 5. The processing platform 500 in this embodiment comprises at least a portion of the given system and includes a plurality of processing devices, denoted 502-1, 502-2, 502-3, . . . 502-K, which communicate with one another over a network 504. The network 504 may comprise any type of network, such as a wireless area network (WAN), a local area network (LAN), a satellite network, a telephone or cable network, a cellular network, a wireless network such as WiFi or WiMAX, or various portions or combinations of these and other types of networks.

The processing device 502-1 in the processing platform 500 comprises a processor 510 coupled to a memory 512. The processor 510 may comprise a microprocessor, a microcontroller, an application specific integrated circuit (ASIC), a field programmable gate array (FPGA) or other type of processing circuitry, as well as portions or combinations of such circuitry elements, and the memory 512, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 502-1 is network interface circuitry 514, which is used to interface the processing device with the network 504 and other system components, and may comprise conventional transceivers.

The other processing devices 502 of the processing platform 500 are assumed to be configured in a manner similar to that shown for processing device 502-1 in the figure.

Again, the particular processing platform 500 shown in the figure is presented by way of example only, and the given system may include additional or alternative processing platforms, as well as numerous distinct processing platforms in any combination, with each such platform comprising one or more computers, storage devices or other processing devices.

Multiple elements of system may be collectively implemented on a common processing platform of the type shown in FIG. 4 or 5, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in FIG. 1 are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising the following steps:
    scanning one or more of source code and configuration information of a given software entity to extract connection information for connections made by said given software entity with other software entities that are external to said given software entity, wherein said given software entity and said other software entities are software applications, wherein at least one of said connections made by said given software entity with said other software entities is an asynchronous connection between said given software entity and said other software entities that employs asynchronous messaging using an intermediate message broker;
    resolving at least one uniform resource identifier in said extracted connection information to obtain a corresponding network address;
    analyzing, using at least one processing device, said source code associated with said asynchronous connection between said given software entity and said other software entities to determine whether said given software entity is at least one producer or at least one consumer of the asynchronous messaging associated with said asynchronous connection between said given software entity and said other software entities that communicate using the intermediate message broker;
    generating a dependency graph for said given software entity identifying a plurality of said other software entities that depend on said given software entity using one or more of said corresponding network address, said at least one producer and said at least one consumer, wherein said step of generating said dependency graph further comprises the step of aggregating said at least one connection of said given software entity with one or more connections by said other software entities; and
    initiating a predefined remedial action in response to one or more of said given software entity and at least one of said plurality of other software entities that depend on said given software entity are one or more of: updated and suspend communications.

2. The method of claim 1, further comprising the step of obtaining, for said given software entity, using an application programming interface, one or more of an application name of said given software entity, a network address where additional software entities can access said given software entity, a location of source code for said given software entity, and a location of configuration information for said given software entity.

3. The method of claim 2, wherein said obtaining step is performed for a plurality of different versions of said given software entity.

4. The method of claim 1, wherein said extracted connection information comprises one or more of a uniform resource identifier and a connection string.

5. The method of claim 1, wherein said connections made by said given software entity with said other software entities comprise one or more of synchronous communications, asynchronous communications, pull communications and push communications.

6. The method of claim 1, wherein said step of resolving said at least one uniform resource identifier in said extracted connection information to obtain said corresponding network address employs a uniform resource identifier lookup.

7. The method of claim 1, wherein said step of analyzing said source code associated with said asynchronous connection further comprises the step of interacting with said intermediate message broker of said asynchronous connection to obtain said at least one producer and said at least one consumer.

8. The method of claim 1, wherein the step of analyzing said source code associated with said asynchronous connection further comprises the step of interrogating said intermediate message broker to obtain a configuration of said asynchronous connection.

9. A computer program product, comprising a non-transitory machine-readable storage medium having encoded therein executable code of one or more software programs, wherein the one or more software programs when executed by at least one processing device perform the following steps:

scanning one or more of source code and configuration information of a given software entity to extract connection information for connections made by said given software entity with other software entities that are external to said given software entity, wherein said given software entity and said other software entities are software applications, wherein at least one of said connections made by said given software entity with said other software entities is an asynchronous connection between said given software entity and said other software entities that employs asynchronous messaging using an intermediate message broker;

resolving at least one uniform resource identifier in said extracted connection information to obtain a corresponding network address;

analyzing, using at least one processing device, said source code associated with said asynchronous connection between said given software entity and said other software entities to determine whether said given software entity is at least one producer or at least one consumer of the asynchronous messaging associated with said asynchronous connection between said given software entity and said other software entities that communicate using the intermediate message broker;

generating a dependency graph for said given software entity identifying a plurality of said other software entities that depend on said given software entity using one or more of said corresponding network address, said at least one producer and said at least one consumer, wherein said step of generating said dependency graph further comprises the step of aggregating said at least one connection of said given software entity with one or more connections by said other software entities; and initiating a predefined remedial action in response to one or more of said given software entity and at least one of said plurality of other software entities that depend on said given software entity are one or more of: updated and suspend communications.

10. An apparatus, comprising:
a memory; and
at least one processing device, coupled to the memory, operative to implement the following steps:
scanning one or more of source code and configuration information of a given software entity to extract connection information for connections made by said given software entity with other software entities that are external to said given software entity, wherein said given software entity and said other software entities are software applications, wherein at least one of said connections made by said given software entity with said other software entities is an asynchronous connection between said given software entity and said other software entities that employs asynchronous messaging using an intermediate message broker;

resolving at least one uniform resource identifier in said extracted connection information to obtain a corresponding network address;

analyzing, using at least one processing device, said source code associated with said asynchronous connection between said given software entity and said other software entities to determine whether said given software entity is at least one producer or at least one consumer of the asynchronous messaging associated with said asynchronous connection between said given software entity and said other software entities that communicate using the intermediate message broker;

generating a dependency graph for said given software entity identifying a plurality of said other software entities that depend on said given software entity using one or more of said corresponding network address, said at least one producer and said at least one consumer, wherein said step of generating said dependency graph further comprises the step of aggregating said at least one connection of said given software entity with one or more connections by said other software entities; and initiating a predefined remedial action in response to one or more of said given software entity and at least one of said plurality of other software entities that depend on said given software entity are one or more of: updated and suspend communications.

11. The apparatus of claim 10, further comprising the step of obtaining, for said given software entity, using an application programming interface, one or more of an application name of said given software entity, a version identifier of said given software entity, a network address where additional software entities can access said given software entity, a location of source code for said given software entity, and a location of configuration information for said given software entity.

12. The apparatus of claim 10, wherein said extracted connection information comprises one or more of a uniform resource identifier and a connection string.

13. The apparatus of claim 10, wherein said connections made by said given software entity with said other software entities comprise one or more of synchronous communications, asynchronous communications, pull communications and push communications.

14. The apparatus of claim 10, wherein said step of resolving said at least one uniform resource identifier in said extracted connection information to obtain said corresponding network address employs a uniform resource identifier lookup.

15. The apparatus of claim 10, wherein said step of analyzing said source code associated with said asynchronous connection further comprises the step of interacting with said intermediate message broker of said asynchronous connection to obtain said at least one producer and said at least one consumer.

16. The apparatus of claim 10, wherein the step of analyzing said source code associated with said asynchronous connection further comprises the step of interrogating said intermediate message broker to obtain a configuration of said asynchronous connection.

17. The computer program product of claim 9, wherein said extracted connection information comprises one or more of a uniform resource identifier and a connection string.

18. The computer program product of claim 9, wherein said step of resolving said at least one uniform resource identifier in said extracted connection information to obtain said corresponding network address employs a uniform resource identifier lookup.

19. The computer program product of claim 9, wherein said step of analyzing said source code associated with said asynchronous connection further comprises the step of interacting with said intermediate message broker of said asynchronous connection to obtain said at least one producer and said at least one consumer.

20. The computer program product of claim 9, wherein the step of analyzing said source code associated with said asynchronous connection further comprises the step of interrogating said intermediate message broker to obtain a configuration of said asynchronous connection.

\* \* \* \* \*

UNITED STATES PATENT AND TRADEMARK OFFICE
CERTIFICATE OF CORRECTION

PATENT NO. : 11,392,372 B1
APPLICATION NO. : 15/897641
DATED : July 19, 2022
INVENTOR(S) : Carpenter et al.

It is certified that error appears in the above-identified patent and that said Letters Patent is hereby corrected as shown below:

In the Claims

Column 8, Lines 32-33, in Claim 1, replace "on said given software entity are one or more of: updated and suspend communications" with -- on said given software entity one or more of: being updated and suspending communications --

Column 9, Lines 44-45, in Claim 9, replace "on said given software entity are one or more of: updated and suspend communications" with -- on said given software entity one or more of: being updated and suspending communications --

Column 10, Lines 21-22, in Claim 10, replace "on said given software entity are one or more of: updated and suspend communications" with -- on said given software entity one or more of: being updated and suspending communications --

Signed and Sealed this
Twentieth Day of September, 2022

Katherine Kelly Vidal
*Director of the United States Patent and Trademark Office*